US012578525B2

(12) United States Patent
Li et al.

(10) Patent No.: US 12,578,525 B2
(45) Date of Patent: Mar. 17, 2026

(54) OPTICAL FIBER WITH INVERSE TRIANGULAR TRENCH DESIGN

(71) Applicant: CORNING INCORPORATED, Corning, NY (US)

(72) Inventors: Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 354 days.

(21) Appl. No.: 18/137,808

(22) Filed: Apr. 21, 2023

(65) Prior Publication Data

US 2023/0266525 A1 Aug. 24, 2023

Related U.S. Application Data

(62) Division of application No. 17/362,101, filed on Jun. 29, 2021, now Pat. No. 11,675,125.

(Continued)

(30) Foreign Application Priority Data

Aug. 18, 2020 (NL) ..................................... 2026285

(51) Int. Cl.
C03B 37/01 (2006.01)
G02B 6/02 (2006.01)
(Continued)

(52) U.S. Cl.
CPC ............ *G02B 6/0286* (2013.01); *C03B 37/01* (2013.01); *C03B 2201/20* (2013.01);
(Continued)

(58) Field of Classification Search
None
See application file for complete search history.

(56) References Cited

U.S. PATENT DOCUMENTS 5,559,921 A 9/1996 Terasawa et al.
7,565,820 B2 7/2009 Foster et al.
(Continued)

FOREIGN PATENT DOCUMENTS

CN 110221383 A * 9/2019 ....... C03B 37/01466
CN 111323872 A 6/2020
(Continued)

OTHER PUBLICATIONS

CN-110221383-A Machine Translation by Clarivate Analytics retrieved Jun. 5, 2025. (Year: 2025).*
(Continued)

*Primary Examiner* — Lisa L Herring
(74) *Attorney, Agent, or Firm* — Amy T Lang

(57) ABSTRACT

A single mode optical fiber is provided that includes a core region having an outer radius $r_1$ and a maximum relative refractive index $\Delta_{1max}$. The single mode optical fiber further includes a cladding region surrounding the core region, the cladding region includes a depressed-index cladding region, a relative refractive index $\Delta_3$ of the depressed-index cladding region increasing with increased radial position. The single mode optical fiber has a bend loss at 1550 nm for a 15 mm diameter mandrel of less than about 0.75 dB/turn, a bend loss at 1550 nm for a 20 mm diameter mandrel of less than about 0.2 dB/turn, and a bend loss at 1550 nm for a 30 mm diameter mandrel of less than 0.005 dB/turn. Additionally, the single mode optical fiber has a mode field diameter of 9.0 microns or greater at 1310 nm wavelength.

19 Claims, 5 Drawing Sheets

Related U.S. Application Data

(60) Provisional application No. 63/048,833, filed on Jul. 7, 2020.

(51) Int. Cl.
    *G02B 6/028*       (2006.01)
    *G02B 6/036*       (2006.01)
    *G02B 6/44*        (2006.01)

(52) U.S. Cl.
    CPC ...... *G02B 6/02009* (2013.01); *G02B 6/02347* (2013.01); *G02B 6/0281* (2013.01); *G02B 6/0283* (2013.01); *G02B 6/03622* (2013.01); *G02B 6/0365* (2013.01); *G02B 6/4403* (2013.01)

(56) References Cited

U.S. PATENT DOCUMENTS

| | | | |
|---|---|---|---|
| 8,081,854 | B2 | 12/2011 | Yoon et al. |
| 8,588,569 | B2 | 11/2013 | Bookbinder et al. |
| 9,588,286 | B2 | 3/2017 | Haruna et al. |
| 9,798,079 | B2 | 10/2017 | Bookbinder et al. |
| 9,851,501 | B2 | 12/2017 | Bookbinder et al. |
| 9,873,629 | B2 | 1/2018 | Dawes et al. |
| 10,048,438 | B2 | 8/2018 | Bookbinder et al. |
| 10,082,622 | B2 | 9/2018 | Bookbinder et al. |
| 10,444,427 | B2 | 10/2019 | Bookbinder et al. |
| 10,591,668 | B2 | 3/2020 | Bookbinder et al. |
| 11,307,350 | B2 | 4/2022 | Li et al. |
| 2002/0031320 | A1* | 3/2002 | Nagayama ............ C03B 37/029 |
| | | | 385/127 |
| 2010/0158460 | A1* | 6/2010 | Yoon ................... G02B 6/03627 |
| | | | 385/124 |
| 2011/0044596 | A1 | 2/2011 | Zhang et al. |
| 2012/0183268 | A1 | 7/2012 | De Montmorillon et al. |
| 2014/0308015 | A1 | 10/2014 | Bookbinder et al. |
| 2017/0129800 | A1 | 5/2017 | Billings et al. |
| 2020/0150336 | A1 | 5/2020 | Bookbinder et al. |
| 2021/0129800 | A1* | 5/2021 | Park ......................... B60S 1/52 |

FOREIGN PATENT DOCUMENTS

| | | | |
|---|---|---|---|
| EP | 1191368 | A2 | 3/2002 |
| EP | 2330447 | A1 | 6/2011 |

OTHER PUBLICATIONS

International Search Report and Written Opinion of the International Searching Authority; PCT/US2021/39090; dated Sep. 22, 2021; 13 pages; European Patent Office.

* cited by examiner

OPTICAL FIBER WITH INVERSE TRIANGULAR TRENCH DESIGN

This Application a division of U.S. patent application Ser. No. 17/362,101, filed on Jun. 29, 2021, which claims the benefit of priority to Dutch Patent Application No. 2026285 filed on Aug. 18, 2020 and from U.S. Provisional Patent Application Ser. No. 63/048,833 filed on Jul. 7, 2020, the content of which is relied upon and incorporated herein by reference in its entirety.

FIELD OF THE DISCLOSURE

This disclosure pertains to optical fibers. More particularly, this disclosure pertains to optical fibers with reduced bend loss across all bend diameters and to optical fibers with an inverse triangular trench design.

BACKGROUND OF THE DISCLOSURE

Optical fibers having low bending loss are widely used in telecommunication systems, particularly in Fiber to the Premises (FTTP) applications, including Fiber to the Home (FTTH) and Fiber to the Building (FTTB) applications. Such applications generally require optical fibers with low bending loss of the optical signal transmitted therethrough, due to the strict installation constraints. For example, the optical fibers are drawn around tight corners in houses or buildings or experience radial compression that may adversely affect the performance or reliability of the optical fibers.

The ITU-T Recommendation G.657 is used as the standard for bending-loss insensitive single mode optical fibers, in which the bending loss is reduced compared to a standard ITU-T G.652 compliant single mode optical fiber.

SUMMARY

In order to be ITU-T G.657 compliant at across all bend diameters, traditional single mode optical fibers have small mode field diameters to provide the required bend-loss insensitivity. Typically, the small mode field diameters are between 8.5 microns and 8.8 microns at 1310 nm. However, such small mode field diameters impair connectivity of these optical fibers when the fibers are connected to a standard single mode optical fiber having nominal mode field diameter of about 9.2 microns at 1310 nm wavelength. Such adversely results in increased connectivity losses.

In order to have good bend insensitivity while reducing the connectivity losses, it is desirable to have a mode field diameter larger than or equal to 9 microns at 1310 nm wavelength and bend performance that is G.657 compliant for both smaller and larger bends. The optical fibers of the present disclosure that have a mode field diameter larger than or equal to 9 microns are G.657 compliant across all bend diameters. The embodiments of the present disclosure include optical fibers with unique inverse triangular trench designs to provide the G.657 compliant bend diameters for both smaller and larger bends while maintaining a mode field diameter of 9 microns or greater at 1310 nm wavelength.

In a first aspect, the present disclosure includes a single mode optical fiber comprising a core region having an outer radius $r_1$ and a maximum relative refractive index $\Delta_{1max}$. A cladding region surrounds the core region, the cladding region comprising a depressed-index cladding region, a relative refractive index $\Delta_3$ of the depressed-index cladding region increasing with increased radial position. The single mode optical fiber has a bend loss at 1550 nm for a 15 mm diameter mandrel of less than about 0.75 dB/turn, a bend loss at 1550 nm for a 20 mm diameter mandrel of less than about 0.2 dB/turn, and a bend loss at 1550 nm for a 30 mm diameter mandrel of less than 0.005 dB/turn. Additionally, the single mode optical fiber has a mode field diameter of 9.0 microns or greater at 1310 nm wavelength.

In another aspect, the present disclosure includes a method of making a single mode optical fiber, the method comprising providing an overclad assembly that forms a hollow central channel and inserting a consolidated core assembly into the central channel to form a core-cladding assembly such that a gap is disposed between the consolidated core assembly and the overclad assembly. The method also comprises heating the core-cladding assembly while flowing a down-dopant precursor into the gap to provide a depressed-index cladding region in a cladding region of the optical fiber, a relative refractive index $\Delta_3$ of the depressed-index cladding region increasing with increased radial position.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
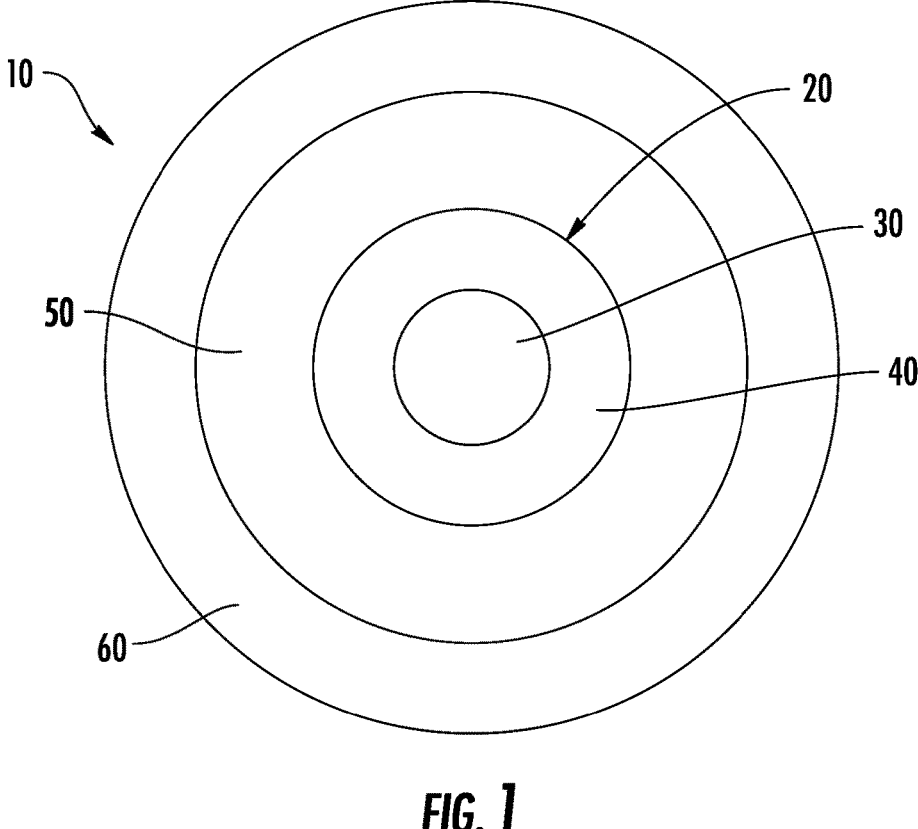
FIG. 1 is a schematic view of a cross-section of a coated optical fiber according to embodiments of the present disclosure.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims which follow, reference will be made to a number of terms which shall be defined to have the following meanings:

"Optical fiber" refers to a waveguide having a glass portion surrounded by a coating. The glass portion includes a core and a cladding and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta\%$) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by Eq. (1) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r_i)\% = 100\frac{(n_i^2 - n_{ref}^2)}{2n_i^2}$$ (1)

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by $\Delta$ (or "delta") or $\Delta\%$ (or "delta %") and its values are given in units of "%", unless otherwise specified. Relative refractive index may also be expressed as $\Delta(r)$ or $\Delta(r)\%$.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})}$$ (2)

where $r_{inner}$ is the inner radius of the region, $r_{outer}$ is the outer radius of the region, and $\Delta(r)$ is the relative refractive index of the region.

The refractive index of an optical fiber profile may be measured using commercially available devices, such as the IFA-100 Fiber Index Profiler (Interfiber Analysis LLC, Sharon, MA USA) or the S14 Refractive Index Profiler (Photon Kinetics, Inc., Beaverton, OR USA). These devices measure the refractive index relative to a measurement reference index, $n(r)-n_{meas}$, where the measurement reference index $n_{meas}$ is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index $n(r)$ is then used to calculate the relative refractive index as defined by Eq. (1).

The term "$\alpha$-profile" or "alpha profile" refers to a relative refractive index profile $\Delta(r)$ that has the functional form defined in Eq. (3):

$$\Delta(r) = \Delta(r_0)\left[1 - \left[\frac{|r - r_0|}{(r_z - r_0)}\right]^\alpha\right]$$ (3)

where $r_o$ is the radial position at which $\Delta(r)$ is maximum, $\Delta(r_0)>0$, $r_z>r_0$ is the radial position at which $\Delta(r)$ decreases to its minimum value, and r is in the range $r_i \leq r \leq r_f$, where $r_i$ is the initial radial position of the $\alpha$-profile, $r_f$ is the final radial position of the $\alpha$-profile, and $\alpha$ is a real number. $\Delta(r_0)$ for an $\alpha$-profile may be referred to herein as $\Delta_{max}$ or, when referring to a specific region i of the fiber, as $\Delta_{imax}$. When the relative refractive index profile of the fiber core region is described by an $\alpha$-profile with $r_0$ occurring at the centerline (r=0), $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right]$$ (4)

When the core region has an index described by Eq. (4), the outer radius $r_1$ can be determined from the measured relative refractive index profile by the following procedure.

Figure 5:
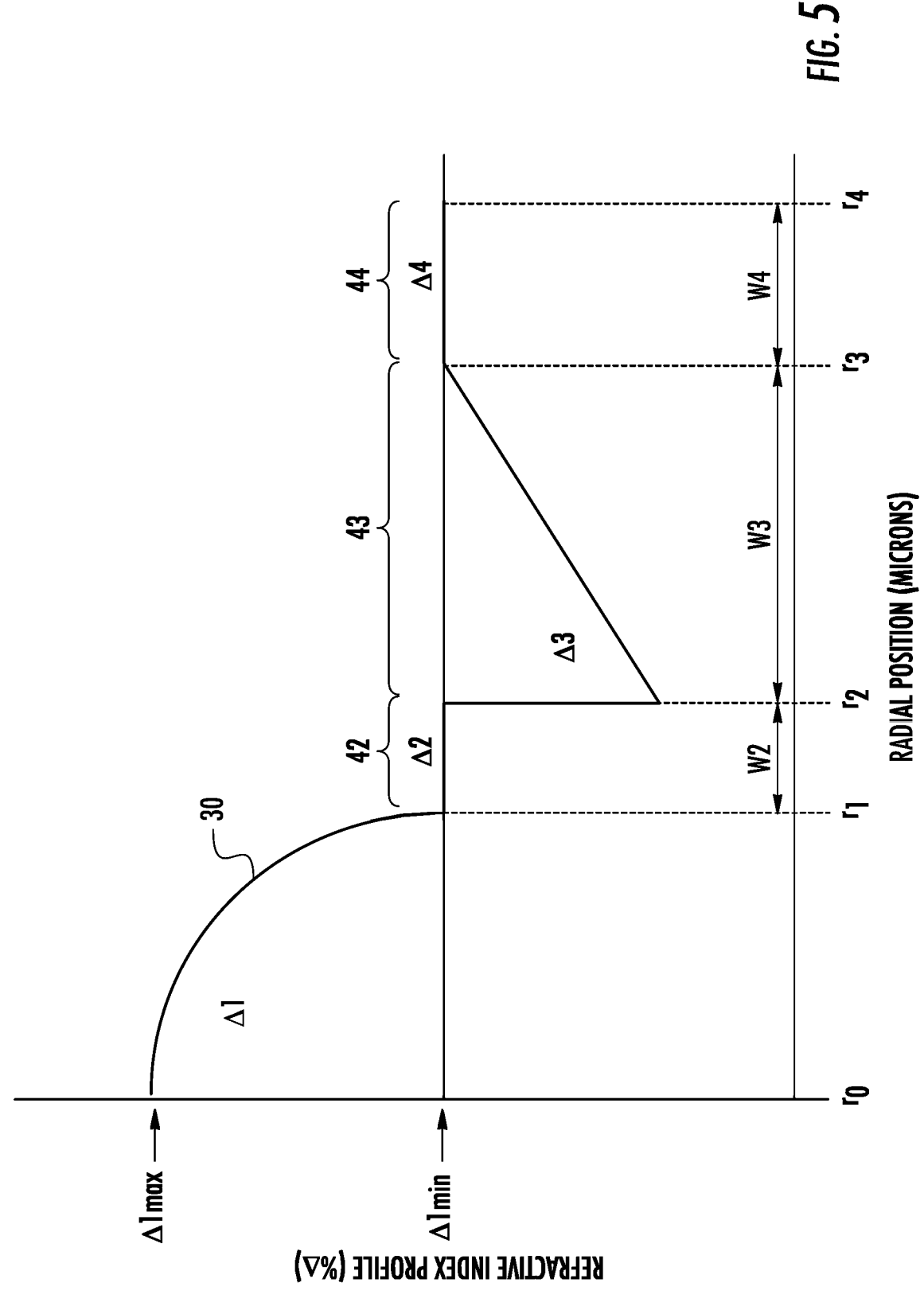
FIG. 5 depicts a relative refractive index profile of an optical fiber according to embodiments of the present disclosure.

Estimated values of the maximum relative refractive index $\Delta_{1max}$, $\alpha$, and outer radius $r_{1est}$ are obtained from inspection of the measured relative refractive index profile and used to create a trial function $\Delta_{trial}$ between $r=-r_{1est}$ and $r=r_{1est}$. A relative refractive index profile of representative glass fibers having cores described by an $\alpha$-profile, in accordance with embodiments of the present disclosure, is shown in FIG. 5.

"Trench volume" is defined as:

$$V_{Trench} = \left| 2 \int_{r_{Trench,inner}}^{r_{Trench,outer}} \Delta_{Trench}(r) r \, dr \right| \tag{5}$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of %$\Delta$micron$^2$, %$\Delta$-micron$^2$, %$\Delta$-$\mu$m$^2$, or %$\Delta\mu$m$^2$, whereby these units can be used interchangeably herein. A trench region is also referred to herein as a depressed-index cladding region and trench volume is also referred to herein as $V_3$.

"Inverse triangular depressed-index cladding region" refers to a trench region that is triangular in shape and that the relative refractive index of the trench increases with increasing radial distance. As discussed further below, in some embodiments, the inverse triangular depressed-index cladding region may have the shape of a right triangle with linear sides. In other embodiments, the outer parameter of the inverse triangular depressed-index cladding region (i.e., the hypotenuse) may be concave, convex, and/or include one or more step changes.

The "mode field diameter" or "MFD" of an optical fiber is defined in Eq. (6) as:

$$MFD = 2w \tag{6}$$

$$w^2 = 2 \frac{\int_0^\infty (f(r))^2 r \, dr}{\int_0^\infty \left(\frac{df(r)}{dr}\right)^2 r \, dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in Eq. (7) as:

$$A_{eff} = \frac{2\pi \left[ \int_0^\infty (f(r))^2 r \, dr \right]^2}{\int_0^\infty (f(r))^4 r \, dr} \tag{7}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The term "attenuation," as used herein, is the loss of optical power as the signal travels along the optical fiber. Attenuation was measured as specified by the IEC-60793-1-40 standard, "Attenuation measurement methods."

The bend resistance of an optical fiber, expressed as "bend loss" herein, can be gauged by induced attenuation under prescribed test conditions as specified by the IEC-60793-1-47 standard, "Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

"Cable cutoff wavelength," or "cable cutoff," as used herein, refers to the 22 m cable cutoff test as specified by the IEC 60793-1-44 standard, "Measurement methods and test procedures—Cut-off wavelength."

The optical fibers disclosed herein include a core region, a cladding region surrounding the core region, and a coating surrounding the cladding region. The core region and cladding region are glass. The cladding region includes multiple regions. The multiple cladding regions are preferably concentric regions. The cladding region includes an inner cladding region, a depressed-index cladding region, and an outer cladding region. As discussed further below, the depressed-index cladding region has an inverse triangular profile. The inner cladding region surrounds and is directly adjacent to the core region. The depressed-index cladding region surrounds and is directly adjacent to the inner cladding region such that the depressed-index cladding region is disposed between the inner cladding region and the outer cladding region in a radial direction. The outer cladding region surrounds and is directly adjacent to the depressed-index cladding region.

The depressed-index cladding region has a lower relative refractive index than each of the inner cladding region and the outer cladding region. The relative refractive index of the inner cladding region may be less than, equal to, or greater than the relative refractive index of the outer cladding region. The depressed-index cladding region may each be referred to herein as a trench or trench region. Furthermore, the depressed-index cladding region contributes to a reduction in bending losses and microbending sensitivity.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed-index cladding region, and radial position $r_4$ and relative refractive index $\Delta_4$ or $\Delta_4(r)$ refer to the outer cladding region. Additionally, a radial position $r_5$ (not shown) refers to a primary coating, radial position $r_6$ (not shown) refers to a secondary coating, and the radial position $r_7$ (not shown) refers to an optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that the surrounding inner cladding region, depressed-index cladding region, outer cladding region, primary coating, and secondary coating are substantially annular in shape. Annular regions are characterized in terms of an inner radius and an outer radius. Radial positions $r_1$, $r_2$, $r_3$, $r_4$, $r_5$, $r_6$, $r_7$, refer herein to the outermost radii of the core region, inner cladding region, depressed-index cladding region, outer cladding region, primary coating, secondary coating, and tertiary coating, respectively. The radius $r_6$ also corresponds to the outer radius of the optical fiber in embodiments without a tertiary coating. When a tertiary coating is present, the radius $r_7$ corresponds to the outer radius of the optical fiber.

The difference between radial position $r_2$ and radial position $r_1$ is the thickness of the inner cladding region. The difference between radial position $r_3$ and radial position $r_2$ is the thickness of the depressed-index cladding region. The difference between radial position $r_4$ and radial position $r_3$ is the thickness of the outer cladding region. The difference between radial position $r_5$ and radial position $r_4$ is the thickness of the primary coating. The difference between radial position $r_6$ and radial position $r_5$ is the thickness of the secondary coating.

Reference will now be made in detail to illustrative embodiments of the present description.

One embodiment relates to an optical fiber. The optical fiber includes a glass fiber surrounded by a coating. An example of an optical fiber is shown in schematic cross-sectional view in FIG. 1. Optical fiber 10 includes glass fiber 20 surrounded by primary coating 50 and secondary coating 60. Glass fiber 20 includes a core region 30 and a cladding region 40. In some embodiments, secondary coating 60 may include a pigment. Further description of glass fiber 20, primary coating 50, and secondary coating 60 is provided below. Additionally, one or more tertiary ink layers may surround secondary coating 60.

Figure 2:
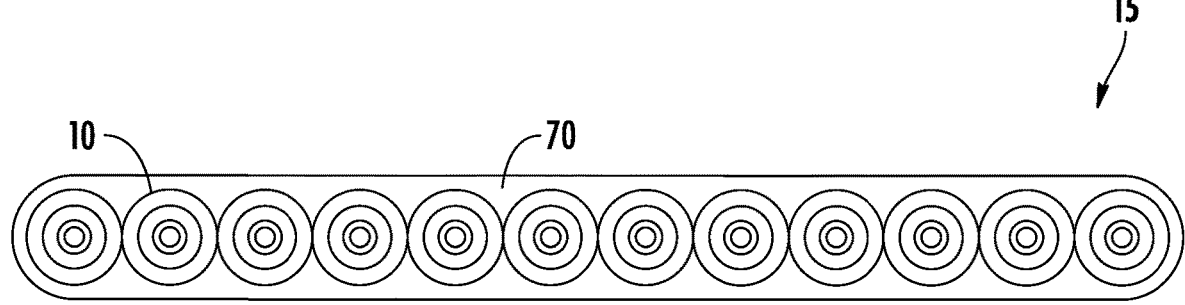
FIG. 2 is a schematic view of a cross-section of an optical fiber ribbon according to embodiments of the present disclosure.

FIG. 2 illustrates an optical fiber ribbon 15, which may include a plurality of optical fibers 10 and a matrix 70 encapsulating the plurality of optical fibers. As shown in FIG. 2, optical fibers 10 are aligned relative to one another in a substantially planar and parallel relationship. The optical fibers in fiber optic ribbon 15 are encapsulated by the matrix 70 in any of several known configurations (e.g., edge-bonded ribbon, thin-encapsulated ribbon, thick-encapsulated ribbon, or multi-layer ribbon) by conventional methods of making fiber optic ribbons. Fiber optic ribbon 15 in the embodiment of FIG. 2 contains twelve (12) optical fibers 10. However, it is contemplated that any number of optical fibers 10 (e.g., two or more) may be employed to form fiber optic ribbon 70 for a particular use. Matrix 70 has tensile properties similar to the tensile properties of a secondary coating and can be formed from the same, similar, or different composition used to prepare a secondary coating.

Figure 3:
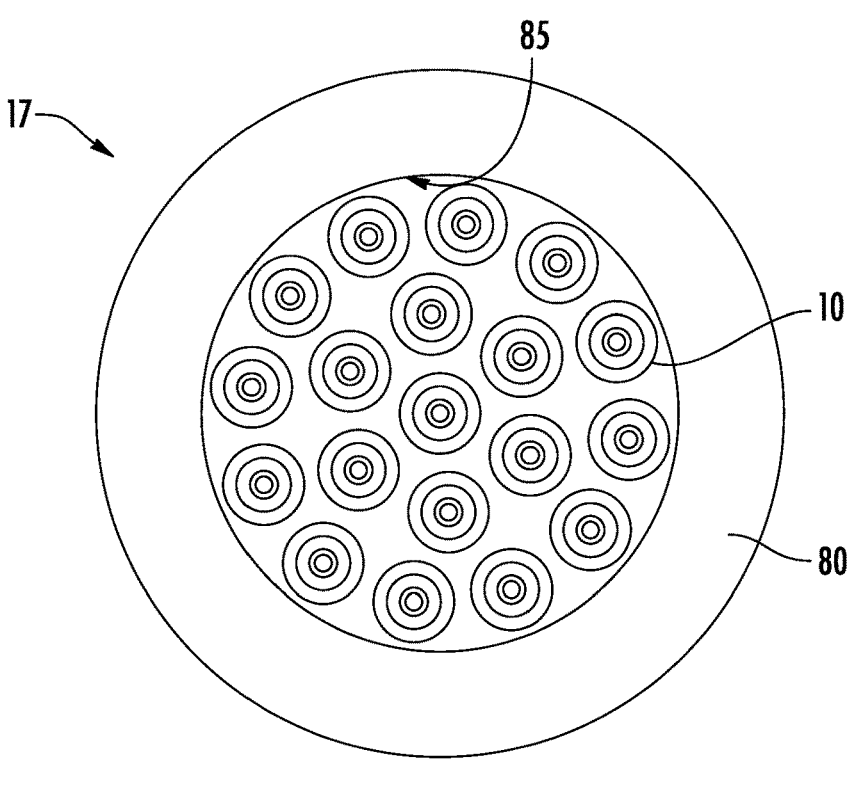
FIG. 3 is a schematic view of a cross-section of an optical fiber cable according to embodiments of the present disclosure.

FIG. 3 illustrates an optical fiber cable 17 that includes a plurality of optical fibers 10 surrounded by a jacket 80. Fibers 10 may be densely or loosely packed into a conduit enclosed by an inner surface 85 of jacket 80. The number of fibers placed in jacket 80 is referred to as the "fiber count" of optical fiber cable 17.

Jacket 80 is formed from an extruded polymer material and may include multiple concentric layers of polymers or other materials. Optical fiber cable 17 may include one or more strengthening members (not shown) embedded within jacket 80 or placed within the conduit defined by inner surface 85. Strengthening members include fibers or rods that are more rigid than jacket 80. The strengthening member may be made from metal, braided steel, glass-reinforced plastic, fiber glass, or other suitable material. Optical fiber cable 17 may include other layers surrounded by jacket 80 such as, for example, armor layers, moisture barrier layers, rip cords, etc. Furthermore, optical fiber cable 40 may have a stranded, loose tube core or other fiber optic cable construction.

As discussed above with reference to FIG. 1, glass fiber 20 includes core region 30 and cladding region 40. Core region 30 has a higher refractive index than cladding region 40, and glass fiber 20 functions as a waveguide. In many applications, core region 30 and cladding region 40 have a discernible core-cladding boundary. Alternatively, core region 30 and cladding region 40 can lack a distinct boundary.

Figure 4:
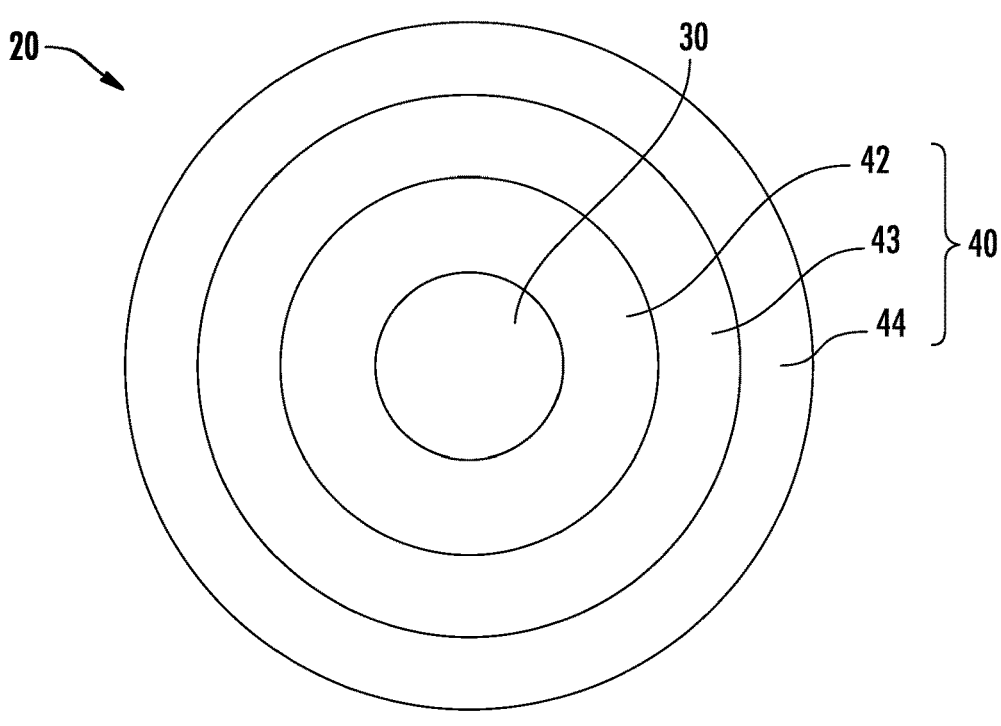
FIG. 4 is a schematic view of a cross-section of an optical fiber according to embodiments of the present disclosure.

A schematic cross-sectional depiction of an exemplary glass fiber 20 is shown in FIG. 4. In FIG. 4, cladding region 40 includes inner cladding region 42, depressed-index cladding region 43, and outer cladding region 44.

FIG. 5 plots an idealized relative refractive index profile of glass fiber 20 as the relative refractive index $\Delta$ versus the radial coordinate r. Core region 30 has relative refractive index $\Delta 1$, with a maximum refractive index of $\Delta_0 = \Delta 1_{MAX}$ at $r=0$ and a gradient $\alpha$-profile, which is described in greater detail below. Inner cladding region 42 has a relative refractive index $\Delta 2$ and a width W2. Depressed-index cladding region 43 can be in the form of a depressed region or a trench and has a width W3 and a relative refractive index $\Delta 3$, with a minimum value $\Delta 3_{MIN}$. Outer cladding region 44 has a width W4 and relative refractive index $\Delta 4$, which is shown by way of example as $\Delta 4 = \Delta 2$. Furthermore, as shown by way of example, $\Delta 3_{MIN} < \Delta 2$ and $\Delta 3_{MIN} < \Delta 4$. Other configurations for the relative refractive index profile are discussed further below.

Core Region

Core region 30 comprises silica glass that is either undoped silica glass, up-doped silica glass, and/or down-doped silica glass. Up-doped silica glass includes silica glass doped with, for example, germanium (e.g., $GeO_2$), phosphorus (e.g., $P_2O_5$), aluminum (e.g. $Al_2O_3$), chlorine, or an alkali metal oxide (e.g. $Na_2O$, $K_2O$, $Li_2O$, $Cs_2O$, or $Rb_2O$). In some embodiments, the core comprises germanium doped glass having a germanium concentration between about 5 wt. % and about 10 wt. %. In embodiments where the core is doped with an alkali dopant, the peak concentration of the alkali in the silica glass may range from about 10 ppm to about 500 ppm, or from about 30 ppm to about 400 ppm. In yet other embodiments, the silica glass of core region 30 is free of germanium and/or chlorine; that is the core region comprises silica glass that lacks germanium and/or chlorine.

Down-doped silica glass includes silica glass doped with, for example, fluorine or boron.

As discussed above, the relative refractive index of core region 30 of glass fiber 20 is described by an $\alpha$-profile with an $\alpha$ value that is in a range of about 7.0 or less, or about 6.0 or less, or about 5.0 or less, or about 4.0 or less, or about 3.0 or less, or about 2.0 or less, or about 1.0 or less. In some other embodiments, the $\alpha$ value is about 8.0 or greater, or about 9.0 or greater, or about 10.0 or greater, or about 11.0 or greater, or about 12.0 or greater, or about 13.0 or greater. In some embodiments, the core $\alpha$ value is less than 100, or less than 50, or less than 20. In some embodiments, the $\alpha$ value is about 2.0, about 2.12, about 2.4, about 3.0, about 3.2, about 4.4, about 10.0, about 12.0, about 12.2, or about 12.4, or about 20.0.

The outer radius $r_1$ of core region 30 is in a range from about 3.0 microns to about 7.0 microns, or about 3.5 microns to about 6.5 microns, or about 4.0 microns to about 5.0 microns, or about 4.2 microns to about 5.3 microns. In some embodiments, the outer radius $r_1$ is about 4.2 microns, or about 4.3 microns, or about 4.4 microns, or about 4.5 microns, or about 5.3 microns, or about 5.4 microns, or about 5.5 microns, or about 5.6 microns.

The maximum relative refractive index $\Delta_0$ or $\Delta_{1max}$ of core region 30 is in a range from about 0.50% or less, or about 0.40% or less, or about 0.39% or less, or about 0.38% or less, or about 0.37% or less, or about 0.36% or less, or about 0.35% or less, or about 0.34% or less, or about 0.33% or less, or about 0.32% or less, or about 0.31% or less, or about 0.30% or less, or about 0.28% or less, or about 0.25% or less. Additionally or alternatively, the maximum relative refractive index $\Delta_0$ or $\Delta_{1max}$ of core region 30 is about 0.10% or greater, or about 0.15% or greater, or about 0.20% or greater, or about 0.25% or greater, or about 0.30% or greater. In some embodiments, the maximum relative refractive index $\Delta_0$ or $\Delta_{1max}$ is about 0.32%, or about 0.33%, or about 0.36%, or about 0.38%.

Although not depicted in FIG. 5, in some embodiments, the relative refractive index of core region 30 may have a centerline dip such that the maximum refractive index of core region 30 and the maximum refractive index of the entire optical fiber 10 is located a small distance away from the centerline of core region 30 rather than at the centerline of core region 30, as depicted in FIG. 5.

Inner Cladding Region

Inner cladding region 42 may be comprised of un-doped silica glass. The inner radius of inner cladding region 42 is $r_1$, as discussed above. The outer radius $r_2$ of inner cladding region 42 is in a range from about 6.0 microns to about 14.0 microns, or about 6.5 microns to about 13.5 microns, or about 7.0 microns to about 13.0 microns, or about 7.5 microns to about 12.5 microns, or about 8.0 microns to about 12.0 microns. In some embodiments, the outer radius $r_2$ is about 7.5 microns, or about 8.5 microns, or about 8.9 microns, or about 9.0 microns, or about 10.2 microns.

The relative refractive index $\Delta_2$ of inner cladding region 42 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_2$ is about 0.0%. The relative refractive index $\Delta_2$ is preferably constant or approximately constant.

Depressed-Index Cladding Region

Depressed-index cladding region 43 comprises down-doped silica glass. In some embodiments, depressed-index cladding region 43 is down-doped with fluorine or boron. However, the down-doping of depressed-index cladding region 43 can also be accomplished by incorporating voids in silica glass.

The inner radius of depressed-index cladding region 43 is $r_2$, as discussed above. The outer radius $r_3$ of depressed-index cladding region 43 is in a range of about 20.0 microns to about 30.0 microns, or about 21.0 microns to about 29.0 microns, or about 22.0 microns to about 28.0 microns, or about 23.0 microns to about 27.0 microns, or about 24.0 microns to about 26.0 microns. In some embodiments, the outer radius $r_3$ is about 24.5 microns, or about 24.9 microns, or about 25.0 microns, or about 26.0 microns, or about 26.2 microns.

In some embodiments, depressed-index cladding region 43 is a depressed-index cladding region that forms a trench design. The trench design may be an offset trench. The minimum relative refractive index $\Delta_3$ ($\Delta_{3MIN}$) of depressed-index cladding region 43 is in a range from about −0.10% to about −0.60%, or about −0.15% to about −0.55%, or about −0.20% to about −0.50%, or about −0.22% to about −0.45%, or about −0.24% to about −0.40%. In some embodiments, the minimum relative refractive index $\Delta_3$ of depressed index cladding region 43 is about −0.24%, or about −0.28%, or about −0.30%, or about −0.32%. The relative refractive index of depressed-index cladding region 43 may increase with increased radial position.

The transition region from inner cladding region 42 to depressed-index cladding region 43 is shown as a step changes in FIG. 5. However, it is to be understood that a step change is an idealization and that the transition region may not be strictly vertical in practice. Instead, the transition region may have a slope or curvature.

As discussed above, depressed-index cladding region 43 has an inverse triangular profile. Thus, the relative refractive index of the trench increases with increasing radial distance and the trench volume of the triangular shape decreases with increasing radial position.

A "volume" $V_3$ of depressed-index cladding region 43 is defined in Eq. (8) as:

$$V_3 = 2\int_{r_2}^{r_3} \Delta_{3-5} r \, dr \tag{8}$$

where $\Delta_{3-5} = (\Delta_3(r) - \Delta_5)$.

The trench volume $V_3$ of depressed-index cladding region 43 may be about 40.0%Δ-micron² to about 95.0%Δ-micron², or about 35.0%Δ-micron² to about 90.0%Δ-micron², or about 40.0%Δ-micron² to about 80.0%Δ-micron², or about 45.0%Δ-micron² to about 70.0%Δ-micron². In some embodiments, the trench volume $V_3$ is about 63.6%Δ-micron², or about 63.7%Δ-micron², or about 64.1%Δ-micron², or about 64.2%Δ-micron², or about 64.3%Δ-micron².

A "volume" $V_{3a}$ of a portion of depressed-index cladding region 43 that is defined by a first radial position at $r_2$ and a second radial position at 20 microns is defined in Eq. (9) as:

$$V_{3a} = 2\int_{r_2}^{20} \Delta_{3-5} r \, dr \tag{9}$$

where $\Delta_{3-5} = (\Delta_3(r) - \Delta_5)$.

The trench volume $V_{3a}$ of this portion of depressed-index cladding region 43 may be about 20.0%Δ-micron² to about 70.0%Δ-micron², or about 25.0%Δ-micron² to about 65.0%Δ-micron², or about 30.0%Δ-micron² to about 60.0%Δ-micron², or about 40.0%Δ-micron² to about 55.0%Δ-micron². In some embodiments, the trench volume $V_{3a}$ is about 51.7%Δ-micron², or about 51.8%Δ-micron², or about 53.5%Δ-micron², or about 54.5%Δ-micron², or about 55.9%Δ-micron².

Trench volume $V_{3a}$ is less than trench volume $V_3$. In some embodiments, a ratio of trench volume $V_{3a}$ to trench volume $V_3$ is about 0.60 or greater, or about 0.65 or greater, or about 0.70 or greater, or about 0.75 or greater, or about 0.80 or greater, or about 0.80 or greater, or about 0.81 or greater, or about 0.82 or greater, or about 0.83 or greater, or about 0.84 or greater. Additionally or alternatively, the ratio of trench volume $V_{3a}$ to trench volume $V_3$ is about 0.95 or less, or about 0.92 or less, or about 0.90 or less, or about 0.88 or less, or about 0.85 or less. In some embodiments, the ratio is about 0.81, or about 0.82, or about 0.84.

A center of mass of the radial position of depressed-index cladding region 43 is defined in Eq. (10) as:

$$r_{3,CM} = \frac{\int_{r2}^{r3} \Delta_{3-5} r^2 dr}{\int_{r2}^{r3} \Delta_{3-5} r dr} \qquad (10)$$

The center of mass of the radial position of depressed-index cladding region 43 is in a range between about 15 microns and about 35 microns, or about 27 microns. In some embodiments, the center of mass of the radial position of depressed-index cladding region 43 is about 25 microns.

FIG. 5 shows depressed-index cladding region 43 with an inverse triangular shape. Specifically, depressed-index cladding region 43 in the embodiment of FIG. 5 comprises a right triangle with linear sides. However, it is also contemplated that the outer parameter of depressed-index cladding region 43 (i.e., the hypotenuse) may be concave, convex, and/or include one or more step changes. Therefore, for example, the outer parameter of depressed-index cladding region 43 may have a concave parabolic profile. In another example, the outer parameter of depressed-index cladding region 43 may include a step change, thus forming a trapezoid shape.

Without intending to be limited by theory, and as discussed further below, the offset inverse triangular trench design, with the trench volumes disclosed herein, provides low bend loss across more bend diameters than conventional fibers. Such reduced bend loss is able to be achieved at a relatively high mode field diameter. Additionally, as also discussed further below, the location of depressed-index cladding region 45 is optimized to maintain a cable cutoff that meets the G.657 standards.

Outer Cladding Region

Outer cladding region 44 may be comprised of un-doped silica glass. The inner radius of outer cladding region 44 is $r_3$, as discussed above. The outer radius $r_4$ of outer cladding region 44 is in a range from about 40.0 microns to about 65 microns, or from about 45.0 microns to about 62.5 microns, or from about 50.0 microns to about 60.0 microns, or from about 52.5 microns to about 57.5 microns. In some embodiments, the outer radius $r_4$ of outer cladding region 44 is about 62.5 microns.

The relative refractive index $\Delta_4$ of outer cladding region 44 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_4$ is about 0.0%. The relative refractive index $\Delta_4$ is preferably constant or approximately constant. Furthermore, is some embodiments, the relative refractive index $\Delta_4$ is equal to or substantially equal to the relative refractive index $\Delta_2$.

Outer Coatings

Primary coating 50 immediately surrounds glass fiber 20, and secondary coating 60 immediately surrounds primary coating 50. In some embodiments, primary coating 50 comprises a low modulus material and secondary coating 60 comprises a high modulus material. One or more of the materials may be, for example, acrylate.

Optical fiber 10 may also include a tertiary coating that surrounds secondary coating 60. The tertiary coating may include pigments, inks, or other coloring agents to mark the optical fiber for identification purposes and typically has a Young's modulus similar to the Young's modulus of the secondary coating.

An outer diameter of secondary coating 60 is an outer diameter of optical fiber 10, when a tertiary layer is not applied. The outer diameter of secondary coating 60 may be about 250 microns or less, or about 220 microns or less, or about 210 microns or less, or about 200 microns or less, or about 190 microns or less, or about 180 microns or less, or about 170 microns or less.

Properties

The optical fibers disclosed herein have good reduced bend sensitivity across all bend diameter (e.g., 15 mm, 20 mm, 30 mm). Thus, the optical fibers disclosed herein meet the G.657 bend loss standards across all these bend diameters. These bend loss standards are achieved while maintaining a high mode field diameter, in contrast to conventional fibers.

The optical fibers disclosed herein have a bend loss at 1550 nm, as determined by the mandrel wrap test having a diameter of 15 mm, of less than about 0.75 dB/turn, or less than about 0.50 dB/turn, or less than about 0.25 dB/turn, or less than about 0.20 dB/turn, or less than about 0.15 dB/turn, or less than about 0.14 dB/turn, or less than about 0.13 dB/turn, or less than about 0.12 dB/turn, or less than about 0.11 dB/turn, or less than about 0.10 dB/turn, or less than about 0.09 dB/turn, or less than about 0.08 dB/turn, or less than about 0.07 dB/turn, or less than about 0.06 dB/turn, or less than about 0.05 dB/turn.

Additionally, the optical fibers disclosed herein have a bend loss at 1550 nm, as determined by the mandrel wrap test having a diameter of 20 mm, of less than about 0.20 dB/turn, or less than about 0.15 dB/turn, or less than about 0.10 dB/turn, or less than about 0.08 dB/turn, or less than about 0.06 dB/turn, or less than about 0.05 dB/turn, or less than about 0.04 dB/turn, or less than about 0.03 dB/turn, or less than about 0.02 dB/turn, or less than about 0.01 dB/turn, or less than about 0.009 dB/turn, or less than about 0.008 dB/turn, or less than about 0.007 dB/turn, or less than about 0.006 dB/turn, or less than about 0.005 dB/turn, or less than about 0.004 dB/turn.

Additionally, the optical fibers disclosed herein have a bend loss at 1550 nm, as determined by the mandrel wrap test having a diameter of 30 mm, of less than about 0.0060 dB/turn, or less than about 0.0050 dB/turn, or less than about 0.0040 dB/turn, or less than about 0.0035 dB/turn, or less than about 0.0030 dB/turn, or less than about 0.0025 dB/turn, or less than about 0.0024 dB/turn, or less than about 0.0023 dB/turn, or less than about 0.0021 dB/turn, or less than about 0.0020 dB/turn, or less than about 0.0019 dB/turn, or less than about 0.0018 dB/turn, or less than about 0.0017 dB/turn, or less than about 0.0016 dB/turn, or less than about 0.0015 dB/turn, or less than about 0.0014 dB/turn, or less than about 0.0013 dB/turn, or less than about 0.0012 dB/turn, or less than about 0.0011 dB/turn, or less than about 0.0010 dB/turn, or less than about 0.0009 dB/turn, or less than about 0.00085 dB/turn, or less than about 0.0008 dB/turn.

As discussed above, and without intending to be limited by theory, the portion of depressed-index cladding region 43 that is defined by the first radial position at $r_2$ and the second radial position at 20 microns provides the G.657 compliant bend losses at smaller bend diameters (e.g., <25 mm) and a portion of depressed-index cladding region 43 that is defined by the second radial position at 20 microns and a third radial position at $r_3$ provides the G.657 compliant bend losses at larger bend diameters (e.g., >25 mm). It is also noted that the position of depressed-index cladding region 43 is chosen such that it has minimal or zero effect on the cable cutoff and does not negatively impact other optical properties (such as effective area, dispersion, etc.).

In addition to the low bend losses disclosed above, the optical fibers disclosed herein also have a mode field diameter, at 1310 nm wavelength, in range of about 8.9 microns or greater, or about 9.0 microns or greater, or about 9.1 microns or greater, or about 9.2 microns or greater, or about 9.3 microns or greater, or about 9.4 microns or greater, or about 9.5 microns or greater, or about 9.6 microns or greater. In some embodiments, the mode field diameter is in a range from about 8.9 microns to about 9.7 microns, or from about 9.0 microns to about 9.6 microns. For example, the mode field diameter, at 1310 nm wavelength, is about 9.12 microns, about 9.19 microns, about 9.20 microns, about 9.26 microns, or about 9.27 microns.

The cable cutoff of the optical fibers disclosed herein is about 1300 nm or less, or about 1260 nm or less, or about 1250 nm or less, or about 1240 nm or less, or about 1230 nm or less, or about 1220 nm or less, or about 1210 nm or less, or about 1205 nm or less, or about 1200 nm or less, or about 1195 nm or less, or about 1190 nm or less, or about 1185 nm or less, or about 1180 nm or less, or about 1175 nm or less, or about 1170 nm or less. For example, the cable cutoff is about 1227 nm, about 1226 nm, about 1222 nm, about 1220 nm, about 1218 nm, about 1216 nm, about 1215 nm, about 1205 nm, about 1201 nm, about 1200 nm, about 1187 nm, or about 1176 nm.

Furthermore, the optical fibers disclosed herein have an effective area, at 1310 nm wavelength, of about 70.0 $micron^2$ or less, or about 69.0 $micron^2$ or less, or about 68.0 $micron^2$ or less, or about 67.0 $micron^2$ or less, or about 66.0 $micron^2$ or less, or about 65.0 $micron^2$ or less, or about 64.0 $micron^2$ or less, or about 63.0 $micron^2$ or less, or about 62.0 $micron^2$ or less, or about 61.0 $micron^2$ or less, or about 60.0 $micron^2$ or less. The optical fibers also have an effective area, at 1550 nm wavelength, of about 75 $micron^2$ or greater, or about 78 $micron^2$ or greater, or about 80 $micron^2$ or greater, or about 82 $micron^2$ or greater, or about 85 $micron^2$ or greater, or about 87 $micron^2$ or greater. Additionally or alternatively, the effective area, at 1550 nm wavelength, is about 95 $micron^2$ or less, or about 90 $micron^2$ or less, or about 85 $micron^2$ or less. In some embodiments, the effective area, at 1550 nm wavelength, is in range between 75 $micron^2$ and about 90 $micron^2$.

The optical fibers disclosed herein also have zero dispersion wavelength from about 1290 nm to about 1330 nm. For example, the zero dispersion wavelength can be from about 1295 nm to about 1325 nm, about 1300 nm to about 1324 nm, or from about 1305 nm to about 1315 nm. For example, the zero dispersion wavelength can be about 1280 nm, about 1285 nm, about 1289 nm, about 1290 nm, about 1300 nm, about 1301 nm, about 1305 nm, about 1306 nm, about 1310 nm, about 1315 nm, or about 1320 nm.

Additionally, the attenuation of the optical fibers disclosed herein is less than or equal to about 0.35 dB/km at 1310 nm wavelength, less than or equal to about 0.2 dB/km at 1550 nm wavelength, and less than or equal to about 0.35 dB/turn at 1625 nm wavelength. In some embodiments, the attenuation is less than or equal to about 0.19 dB/turn, or less than or equal to about 0.18 dB/turn, or less than or equal to about 0.185 dB/turn at 1550 nm wavelength.

According to an aspect of the present disclosure, the optical fibers have a dispersion having an absolute value at 1310 nm in a range between about −1.5 ps/nm/km and about 1.0 ps/nm/km and a dispersion slope at 1310 nm in a range between about 0.015 ps/nm²/km and 0.1 ps/nm²/km. For example, the absolute value of the dispersion at 1310 nm is from about −1.2 ps/nm/km to about 0.8 ps/nm/km, or about −1.0 ps/nm/km to about 0.5 ps/nm/km. For example, the absolute value of the dispersion at 1310 is about −1.1 ps/nm/km, or about −0.8 ps/nm/km, or about −0.7 ps/nm/km, or about −0.4 ps/nm/km, or about −0.3 ps/nm/km, or about 0.1 ps/nm/km, or about 0.2 ps/nm/km. In some examples, the dispersion slope at 1310 nm is about 0.015 ps/nm²/km to about 0.095 ps/nm²/km, about 0.025 ps/nm²/km to about 0.1 ps/nm²/km, about 0.03 ps/nm²/km to about 0.1 ps/nm²/km, about 0.035 ps/nm²/km to about 0.1 ps/nm²/km, about 0.04 ps/nm²/km to about 0.1 ps/nm²/km, about 0.045 ps/nm²/km to about 0.09 ps/nm²/km.

According to an aspect of the present disclosure, the optical fibers have a dispersion at 1550 nm of less than about 22 ps/nm/km and a dispersion slope at 1550 nm of less than about 0.1 ps/nm²/km. For example, the dispersion at 1550 nm is from about 10 ps/nm/km to about 22 ps/nm/km, about 10 ps/nm/km to about 22 ps/nm/km, about 10 ps/nm/km to about 20 ps/nm/km, about 10 ps/nm/km to about 15 ps/nm/km, about 15 ps/nm/km to about 22 ps/nm/km, or about 15 ps/nm/km to about 20 ps/nm/km. For example, the dispersion at 1550 is about 10 ps/nm/km, about 15 ps/nm/km, about 16 ps/nm/km, about 17 ps/nm/km, about 17.5 ps/nm/km, about 18 ps/nm/km, about 19 ps/nm/km, about 19.5 ps/nm/km, about 19.6 ps/nm/km, about 20 ps/nm/km, about 20.1 ps/nm/km, about 22 ps/nm/km, or any value between these values. In some examples, the dispersion slope at 1550 nm is about 0.04 ps/nm²/km to about 0.1 ps/nm²/km, about 0.05 ps/nm²/km to about 0.1 ps/nm²/km, about 0.055 ps/nm²/km to about 0.1 ps/nm²/km, about 0.06 ps/nm²/km to about 0.1 ps/nm²/km, about 0.08 ps/nm²/km to about 0.1 ps/nm²/km, about 0.04 ps/nm²/km to about 0.08 ps/nm²/km, about 0.05 ps/nm²/km to about 0.08 ps/nm²/km, about 0.055 ps/nm²/km to about 0.08 ps/nm²/km, about 0.06 ps/nm²/km to about 0.08 ps/nm²/km, about 0.04 ps/nm²/km to about 0.06 ps/nm²/km, about 0.05 ps/nm²/km to about 0.06 ps/nm²/km, or about 0.055 ps/nm²/km to about 0.06 ps/nm²/km. For example, the dispersion slope at 1550 nm is about 0.04 ps/nm²/km, about 0.05 ps/nm²/km, about 0.055 ps/nm²/km, about 0.057 ps/nm²/km, about 0.058 ps/nm²/km, about 0.059 ps/nm²/km, about 0.06 ps/nm²/km, about 0.061 ps/nm²/km, about 0.07 ps/nm²/km, or about 0.08 ps/nm²/km.

EXEMPLARY EMBODIMENTS

Provided below are exemplary embodiments of the optical fibers disclosed herein. The below examples are intended to be exemplary, and are not intended to limit the scope of the disclosure.

Figure 6:
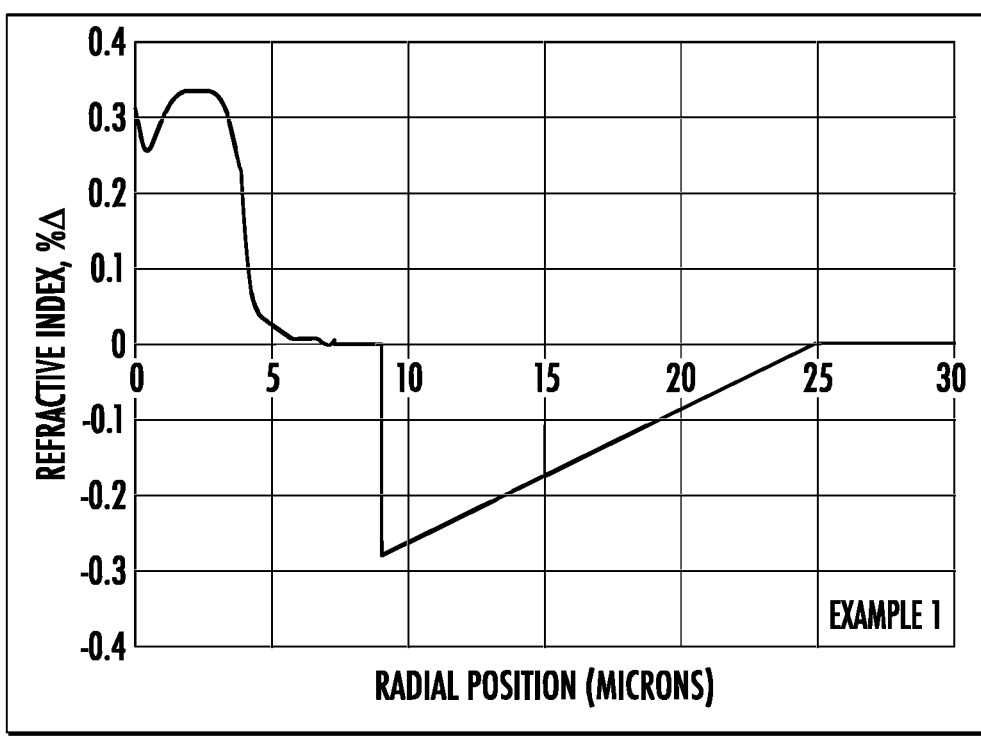
FIGS. 6 and 7 depict relative refractive index profiles of optical fibers according to exemplary embodiments of the present disclosure.
Figure 7:
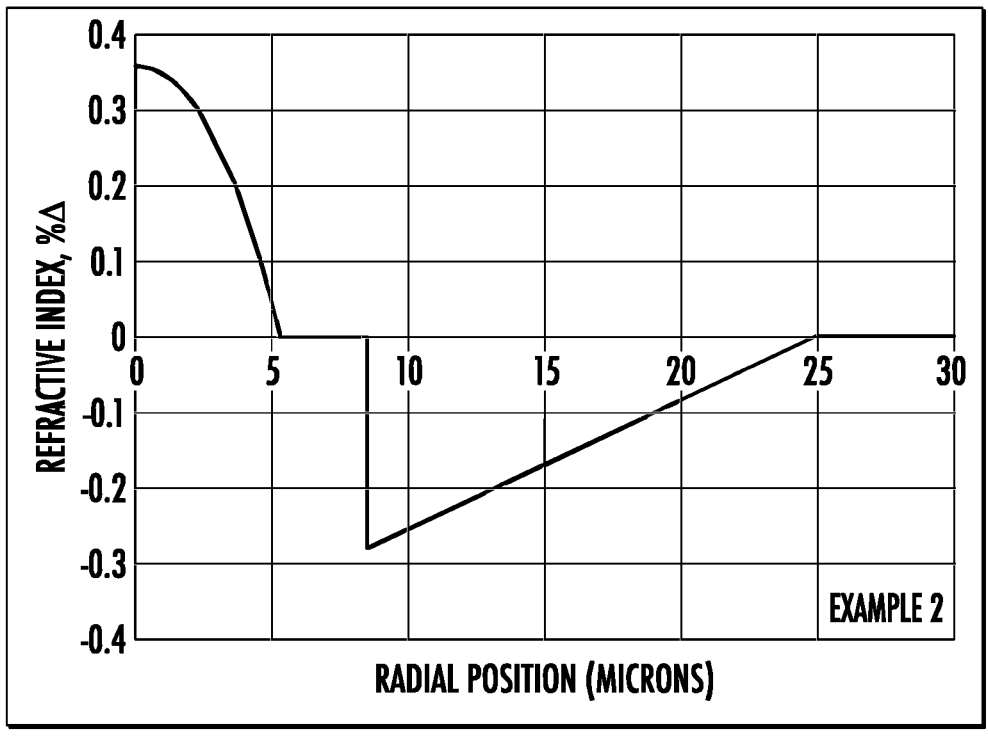

Table 1 below provides two exemplary embodiments, each with an inverse triangular depressed-index cladding region according to aspects of the present disclosure. Thus, the exemplary embodiments of Table 1 meet the G.657 standards across all bend diameters while maintaining a sufficiently high mode field diameter. Exemplary Embodiment 1 of Table 1 is shown in FIG. 6, and Exemplary Embodiment 2 of Table 1 is shown in FIG. 7.

TABLE 1

|  | Exemplary Embodiment 1 | Exemplary Embodiment 2 |
|---|---|---|
| Core Region Maximum Relative Refractive Index, $\Delta_{1max}$ (%) | 0.326 | 0.36 |
| Core Region Radius, $r_1$ (microns) | 4.2 | 5.3 |

TABLE 1-continued

| | Exemplary Embodiment 1 | Exemplary Embodiment 2 |
|---|---|---|
| Core Region Alpha | 12 | 2.12 |
| Inner Cladding Region Relative Refractive Index, $\Delta_2$ (%) | 0 | 0 |
| Inner Cladding Region Radius, $r_2$ (microns) | 9 | 8.5 |
| Depressed-Index Cladding Region Shape | Inverse Triangular | Inverse Triangular |
| Depressed-Index Cladding Region Minimum Relative Refractive Index, $\Delta_{3min}$ (%) | −0.28 | −0.28 |
| Depressed-Index Cladding Region Radius, $r_3$ (micron) | 24.9 | 24.9 |
| Volume of Depressed-Index Cladding Region up to 20 microns, $V_{3a}$ (%Δ micron$^2$) | 53.5 | 51.87 |
| Volume of Depressed-Index Cladding Region, $V_3$ (%Δ micron$^2$) | 63.67 | 64.14 |
| Ratio of $V_{3a}/V_3$ | 0.84 | 0.81 |
| Outer Cladding Region Relative Refractive Index, $\Delta_6$ (%) | 0 | 0 |
| Outer Cladding Region Radius, r4 (microns) | 62.5 | 62.5 |
| Mode Field Diameter at 1310 nm (micron) | 9.19 | 9.12 |
| Effective Area at 1310 nm (micron$^2$) | 65.89 | 63.22 |
| Zero Dispersion Wavelength (nm) | 1310 | 1315 |
| Dispersion at 1310 nm (ps/nm/km) | 0 | −0.145 |
| Dispersion Slope at 1310 nm (ps/nm2/km) | 0.041 | 0.029 |
| Mode Field Diameter at 1550 nm (micron) | 10.34 | 10.88 |
| Effective Area at 1550 nm (micron$^2$) | 81.73 | 87.73 |
| Dispersion at 1550 nm (ps/nm/km) | 18.43 | 15.27 |
| Dispersion Slope at 1550 nm (ps/nm2/km) | 0.0629 | 0.059 |
| Cable Cutoff (nm) | 1201 | 1187 |
| Bend Loss for 15 mm mandrel diameter at 1550 nm (dB/turn) | 0.057 | 0.057 |
| Bend Loss for 20 mm mandrel diameter at 1550 nm (dB/turn) | 0.024 | 0.033 |
| Bend Loss for 30 mm mandrel diameter at 1550 nm (dB/turn) | 0.0017 | 0.022 |

EXEMPLARY METHODS

The optical fibers disclosed herein can be made using a cane in soot process. More specifically, the process involves separately forming a core assembly and an overclad assembly, which are then assembled to construct an optical fiber preform. In the embodiments disclosed herein, the core assembly and the overclad assembly are each formed by depositing consecutive layers of silica soot or silica-doped soot on a bait rod using a vapor deposition process, such as an outside vapor deposition (OVD) process, a plasma chemical vapor deposition (PCVD) process, a modified chemical vapor deposition (MCVD) process, or a vapor-phase axial deposition (VAD) process. The core assembly comprises the portions of the optical fiber preform corresponding to core region 30 and inner cladding region 42. As discussed above, in some embodiments, core region 30 comprises germanium-doped silica glass. The overclad assembly comprises the portions of the optical fiber preform corresponding to depressed-index cladding region 43 and outer cladding region 44.

Once the core assembly has been formed on a bait rod, the bait rod is removed and the core assembly is consolidated into solid glass. Specifically, after the bait rod is removed, the core assembly is first dried in a flowing dehydration gas, such as chlorine at a temperature between about 1000° C. and about 1200° C., for example, at about 1000° C., 1025° C., 1050° C., 1075° C., 1100° C., 1125° C., 1150° C., 1175° C., or 1200° C., and all temperatures between these values. Next, the core assembly is heated (e.g., at above 1450° C.) to sinter the core assembly into glass, thus forming a consolidated core assembly. The consolidated core assembly comprises core region 30 and inner cladding region 42.

The overclad assembly comprises the portions of the optical fiber preform corresponding to depressed-index cladding region 43 and outer cladding region 44. Similar to the core assembly, the overclad assembly is also formed on a bait rod. However, forming of the overclad assembly occurs in a process separate from the core assembly manufacturing process. Once the overclad assembly has been formed on the bait, rod, the bait rod is removed, which leaves a hollow central channel extending through the assembly. The consolidated core assembly (which was formed by sintering the core assembly, as discussed above) is then inserted within and through the central channel of the overclad assembly to form a core-cladding assembly. When the consolidated core assembly is positioned in the central channel of the overclad assembly, a gap exists between the consolidated core assembly and the overclad assembly, thus forming a channel between the two assemblies.

Figure 8:
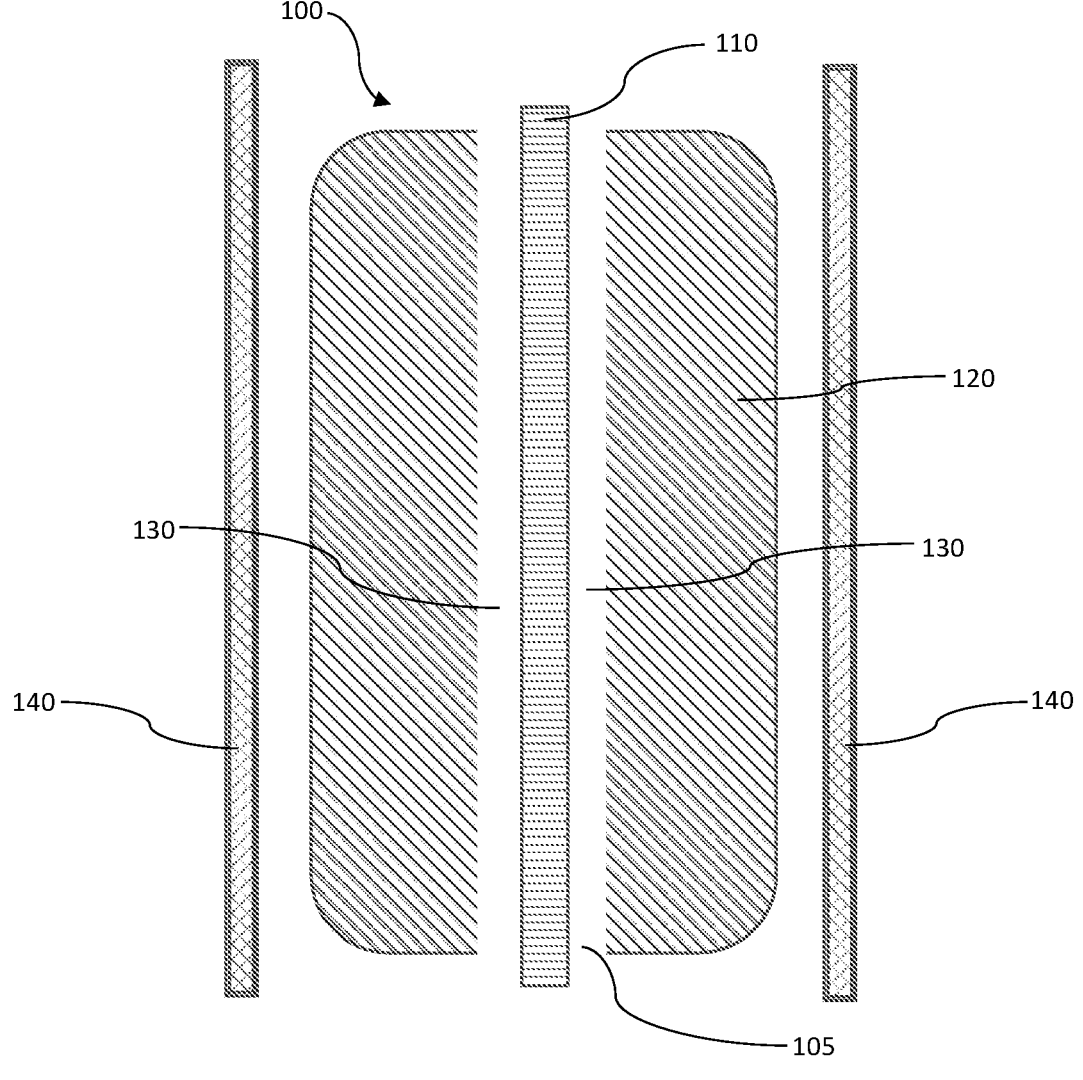
FIG. 8 depicts an exemplary core-cladding assembly during a process of making the optical fiber according to embodiments of the present disclosure.

FIG. 8 shows an exemplary core-cladding assembly 100 comprising a consolidated core assembly 110 disposed within a central channel 105 of an overclad assembly 120. Thus, a gap 130 exists between consolidated core assembly 110 and overclad assembly 120. As shown in FIG. 8, core-cladding assembly 100 is disposed within a furnace 140. As discussed further below, heating of core-cladding assembly 100 within furnace 140 forms an optical fiber preform from the assembly.

When the consolidated core assembly is first disposed within and through the central channel of the overclad assembly, at this stage, depressed-index cladding region 43 and outer cladding region 44 have approximately the same relative refractive index values. Next, the core-cladding assembly is heated so that the overclad assembly collapses on the consolidated core assembly, which forms the optical fiber preform. During this heating step, a down-dopant may flow in the gap between the consolidated core assembly and the overclad assembly, thus lowering the relative refractive index of depressed-index cladding region 43 relative to outer cladding region 44. Therefore, depressed-index cladding region 43 has a lower relative refractive index $\Delta_3$ than the relative refractive index $\Delta_4$ of outer cladding region 44. In some embodiments, the down-dopant flows within the gap at a volume fraction between about 1% and about 30% of the total flow of gases within the gap (the other gases flowing with the gap include, for example, helium, chlorine, carbon monoxide, and/or argon).

Exemplary embodiments of down-dopants include $SiF_4$, $C_2F_6$, $CF_4$, $SF_6$, or combinations thereof. The down-dopant may penetrate the overclad assembly from an outer surface of the assembly to a radial position corresponding to $r_3$, thus penetrating the overclad assembly for the entire width of depressed-index cladding region 43.

The overclad assembly may be exposed to a predetermined amount of down-dopant such that the amount of down-dopant is only able to penetrate the overclad assembly for the entire width of depressed-index cladding region 43 without penetrating into outer cladding region 44. Thus, the amount of down-dopant is determined so that it does not diffuse into the portions of the optical fiber corresponding to outer cladding region 44. Stated another way, the amount of down-dopant provided in the gap is only able to penetrate into the portions of the optical fiber up to the radial position corresponding to $r_3$. Therefore, the relative refractive index $\Delta_4$ of outer cladding region 44 is higher than the relative refractive index $\Delta_3$ of depressed-index cladding region 43 after the down-doping step. Due to this down-doping step (i.e., flowing of the down-dopant within the gap), depressed-index cladding region 43 may have a fluorine concentration between about 0.5 wt. % and about 2.0 wt. %, or between about 0.8 wt. % and about 1.8 wt. %, or between about 0.1 wt. % and about 1.5 wt. %, or between about 0.15 wt. % and about 1.0 wt. %, or between about 0.25 wt. % and about 0.75 wt. %. The fluorine down-dopant penetrates from the outside of the overclad assembly to a radial position of about 20 microns to about 35 microns. Thus, the penetration of the fluorine down-dopant is between about 0.20% and 0.45%, or between about 0.25% and about 0.40%, or about 0.5% of the radius of the overclad assembly.

The inverse triangular shape of depressed-index cladding region 43, as shown in FIG. 5 for example, is formed when the concentration of the down-dopant (e.g., fluorine) at the inside of the overclad assembly is significantly higher than the concentration of the down-dopant at the outside of the overclad assembly. Thus, in some embodiments, the concentration of the down-dopant at the outside of the overclad assembly may be approximately zero, and the concentration of the down-dopant is the maximum at the inside of the overclad assembly.

As discussed above, the core-cladding assembly is heated so that the overclad assembly collapses on the consolidated core assembly, which forms the optical fiber preform. This heating step may be performed at a temperature between about 1200° C. and about 1550° C., or about 1225° C. and about 1500° C., or for example, at about 1250° C., 1260° C., 1270° C., 1280° C., 1290° C., 1300° C., 1310° C., 1320° C., 1330° C., 1340° C., 1350° C., 1400° C., 1425° C., 1450° C., 1475° C. and all temperatures between these values. Furthermore, the heating of the core-cladding assembly comprises sintering of the overclad assembly to form a seed free fully densified glass cladding layer. Therefore, the overclad assembly collapses onto the consolidated core assembly, which forms the optical fiber preform.

The optical fiber preform is then drawn into an optical fiber, which may be used in telecommunication systems.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of making a single mode optical fiber, the method comprising:

providing an overclad assembly that forms a hollow central channel;

inserting a consolidated core assembly into the hollow central channel to form a core-cladding assembly such that a gap is disposed between the consolidated core assembly and the overclad assembly;

heating the core-cladding assembly to collapse the overclad assembly on the consolidated core assembly to form a single mode optical fiber preform, and while heating the core-cladding assembly, flowing a down-dopant precursor into the gap to provide a depressed-cladding index region in a cladding region of the single mold optical fiber drawn from the single mode optical fiber preform, wherein:

a relative refractive index $\Delta_3$ of the depressed-index cladding region increases with increased radial position, and the depressed-index cladding region comprises a volume $V_{3a}$, which is defined by a first radial position at an inner radius of the depressed-index cladding region and a second radial position at 20 microns, in a range of about 20.0% $\Delta$-micron$^2$ to about 70.0% $\Delta$-micron$^2$.

2. The method of claim 1, wherein the depressed-index cladding region has an inverse triangular shape.

3. The method of claim 1, wherein the down-dopant comprises at least one of $SiF_4$, $C_2F_6$, $CF_4$, $SF_6$, or combinations thereof.

4. The method of claim 1, wherein the overclad assembly comprises portions of the single mode optical fiber corresponding to the depressed-index cladding region and an outer cladding region, and when the consolidated core assembly is inserted into the hollow central channel of the overclad assembly, the depressed-index cladding region in the overclad assembly and the outer cladding region in the overclad assembly have the same relative refractive index.

5. The method of claim 1, wherein the down-dopant precursor flows within the gap at a volume fraction between about 1% and about 30% of a total flow of gases within the gap.

6. The method of claim 1, wherein the overclad assembly comprises portions of the single mode optical fiber corresponding to the depressed-index cladding region and an outer cladding region, and the down-dopant precursor penetrates the overclad assembly for an entire width of the depressed-index cladding region without penetrating into the outer cladding region of the single mode optical fiber, the outer cladding region being radially outward of the depressed-index cladding region in the single mode optical fiber.

7. The method of claim 6, wherein the down-dopant precursor penetrates from outside of the overclad assembly to a radial position of about 20 microns to about 35 microns of the overclad assembly to form the depressed-index cladding region in the single mode optical fiber.

8. The method of claim 1, wherein, after flowing the down-dopant precursor into the gap, the depressed-index cladding region has a fluorine concentration between about 0.5 wt. % to about 2.0 wt. %.

9. The method of claim 8, wherein the fluorine concentration is between about 0.8 wt. % to about 1.8 wt. %.

10. The method of claim 1, wherein, after flowing the down-dopant precursor into the gap, the depressed-index cladding region has a fluorine concentration between about 0.1 wt. % to about 1.5 wt. %.

11. The method of claim 10, wherein the fluorine concentration is between about 0.15 wt. % and about 1.0 wt. %.

12. The method of claim 11, wherein the fluorine concentration is between about 0.25 wt. % to about 0.75 wt. %.

13. The method of claim 1, wherein, after flowing the down-dopant precursor into the gap, a concentration of the down-dopant precursor at an inside of the overclad assembly is higher than a concentration of the down-dopant precursor at an outside of the overclad assembly.

14. The method of claim 1, wherein the heating step is performed at a temperature between about 1200° C. and about 1550° C.

15. The method of claim 1, wherein the single mode optical fiber has a bend loss at 1550 nm for a 15 mm diameter mandrel of less than about 0.75 dB/turn, a bend loss at 1550 nm for a 20 mm diameter mandrel of less than about 0.20 dB/turn, and a bend loss at 1550 nm for a 30 mm diameter mandrel of less than 0.005 dB/turn.

16. The method of claim 1, wherein the single mode optical fiber has a mode field diameter of about 9.0 microns or greater at 1310 nm wavelength.

17. The method of claim 1, wherein the single mode optical fiber has a cable cutoff of less than or equal to about 1260 nm.

18. The method claim 1, wherein the single mode optical fiber cable has zero dispersion wavelength between about 1300 nm and about 1324 nm.

19. The method of claim 1, wherein:

the single mode optical fiber has a bend loss at 1550 nm for a 15 mm diameter mandrel of less than about 0.75 dB/turn, a bend loss at 1550 nm for a 20 mm diameter mandrel of less than about 0.20 dB/turn, and a bend loss at 1550 nm for a 30 mm diameter mandrel of less than 0.005 dB/turn, and the single mode optical fiber has a mode field diameter of about 9.0 microns or greater at 1310 nm wavelength.

* * * * *